United States Patent [19]
Peterson et al.

[11] Patent Number: 5,421,611
[45] Date of Patent: Jun. 6, 1995

[54] SUPPORTING AND ELEVATING DEVICE FOR A SNOWMOBILE

[76] Inventors: Michael Peterson, 6682 E. Shadow Lake Dr.; Douglas Koppy, 6685 E. Shadow Lake Dr.; Michael Anderson, 6674 E. Shadow Lake Dr., all of Lino Lakes, Minn. 55014

[21] Appl. No.: 155,520

[22] Filed: Nov. 22, 1993

Related U.S. Application Data

[63] Continuation-in-part of Ser. No. 47,924, Apr. 19, 1993, abandoned.

[51] Int. Cl.[6] ............................................. B60R 27/00
[52] U.S. Cl. .................................. 280/763.1; 280/293; 180/184; 180/190; 254/418
[58] Field of Search .................. 280/763.1, 764.1, 293; 180/182, 184, 185, 186, 190; 248/688, 674, 676; 254/418

[56] References Cited

U.S. PATENT DOCUMENTS

| | | | |
|---|---|---|---|
| 3,477,734 | 11/1989 | Albertson | 280/763.1 |
| 3,980,320 | 9/1976 | Marchello | 280/293 |
| 4,469,348 | 9/1984 | Crook | 280/475 |

*Primary Examiner*—Richard M. Camby
*Attorney, Agent, or Firm*—Leo Gregory

[57] ABSTRACT

A self positioning elevating and supporting device carried at the rearward end portion of a snowmobile which upon being released from an inoperative position self positions itself to elevate and support in elevated position the rearward end portion of a snowmobile raising the underlying track arrangement thereof above the supporting ground surface.

7 Claims, 3 Drawing Sheets

SUPPORTING AND ELEVATING DEVICE FOR A SNOWMOBILE

This application is a continuation-in-part of application Ser. No. 047,924, filed Apr. 19, 1993, now abandoned.

BACKGROUND OF THE INVENTION

1. Field of Invention

Relates to a self positioning device for supporting one end portion of a snowmobile in a elevated position.

2. Description of the Previous Art

Snowmobiles are propelled by an endless surface engaging driving belt known in the art as a track. To have a propelling engagement with the surface the track is equipped at its bottom with cleats as in a molded track. Hence the snowmobile is driven by surface engagement of the cleated track surface with the underlying snow covered ground surface.

Unless elevated, the snowmobile or vehicle, as it may be referred to, rests directly upon the underlying surface which is generally ice or snow as the snowmobile is a winter weather vehicle.

When not in use it is generally the case for the snowmobile to be parked out of doors whereby snow underlies and clings to its track. It is not unlikely for ice to form at the underside of the vehicle and cling to the track.

Thus more often than not, the rear end of the vehicle must be raised and then dropped to jar and break away any underlying ice which may have formed and free the track so that it may be driven.

SUMMARY OF THE INVENTION

It is a principal object of this invention to maintain the rear track portion of a snowmobile in a raised position when it is left for any length of time in an outdoor location during the season in which it is used.

It is another object of this invention to avoid the presence of snow to accumulate about and upon the track thereof and to avoid the snow from forming as ice about and upon the track.

It is a more particular object of this invention to maintain the track as free as possible from any impediments which would adversely affect the starting up of the track and the locomotion of the vehicle.

It is a still more specific object to provide an automatically self positioning support device for supporting the rear track portion of a snowmobile in a raised position upon the release of the device from an elevated inoperative position at the rear end of the snowmobile.

There are many other advantages resulting from the use of the device. In parking by raising the track above undersurface engagement, in holding the track in an elevated position there results a longer life of the track and at the same time the elevation relieves tension on the main spring and the shocks and further, the snowmobile may be started and the belt driven in a rolling position. Further, if service is required in the undercarriage portion of the vehicle, it is readily accessible.

Other objects and advantages of the invention will be set forth in the following description made in connection with the accompanying drawings in which the reference characters refer similar parts throughout the several views.

DESCRIPTION OF A PREFERRED EMBODIMENT

Figure 4:
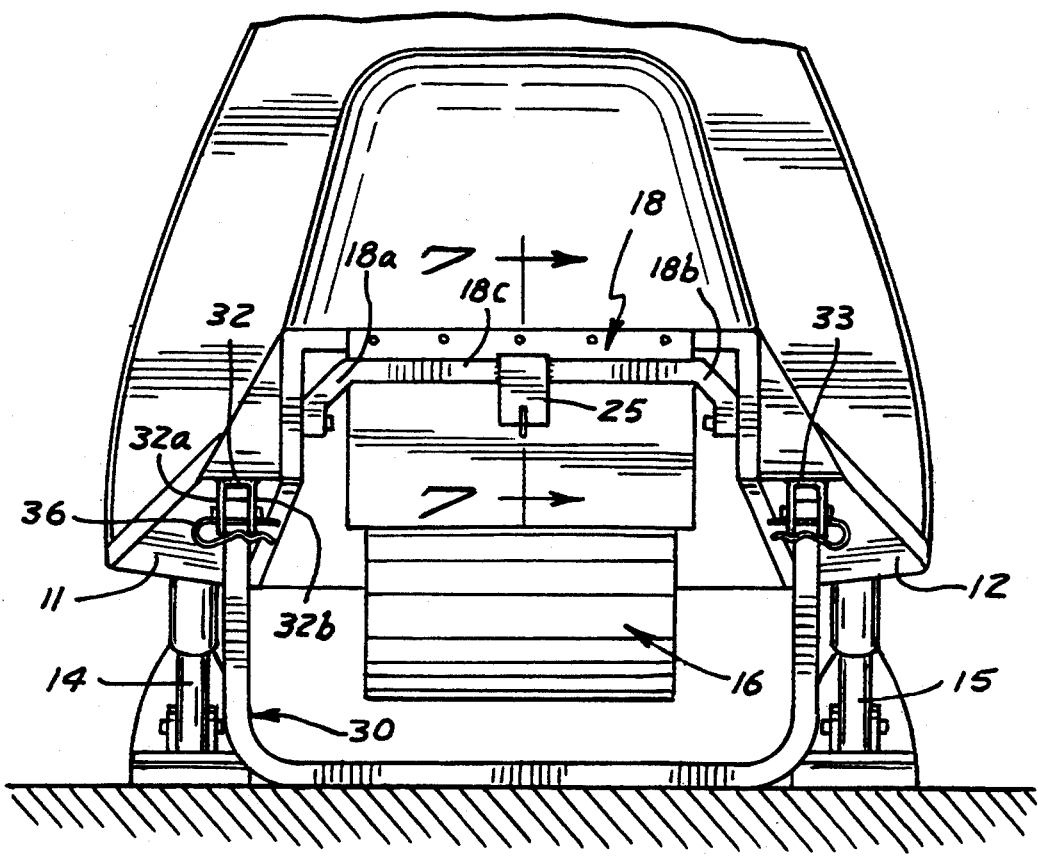
FIG. 4 is a broken rear elevational view showing the invention herein in an inoperative position.

This invention relates to a track elevating support for a for a snowmobile. A representative snowmobile is indicated at 10 in FIG. 1, having a body 11 and as indicated in FIG. 4, having running boards 12 and 13. As here illustrated, the running boards are integral with supporting frame members not shown separately. Supporting the forward portion of said snowmobile are ski-runners 14 and 15 and driving said snowmobile is a conventional track or track arrangement as indicated at 16.

Extending across the rear of said snowmobile as a projecting U-shaped frame member is a handle member 18 having side arms 18a and 18b secured to adjacent inward side wall or frame portions 20 and 21 of said housing as by bolts 22. Depending from the rear of said body 11 is a flexible snow deflecting flap 19.

The invention herein consists of a U-shaped elevating member 30 to raise the rear end portion of a snowmobile sufficiently to have the track 16 clear of the underlying or supporting surface 32 while the snowmobile is not in use and to permit the track to be started in driving position while clear of the supporting surface for an easy non-dragging start.

Figure 3:
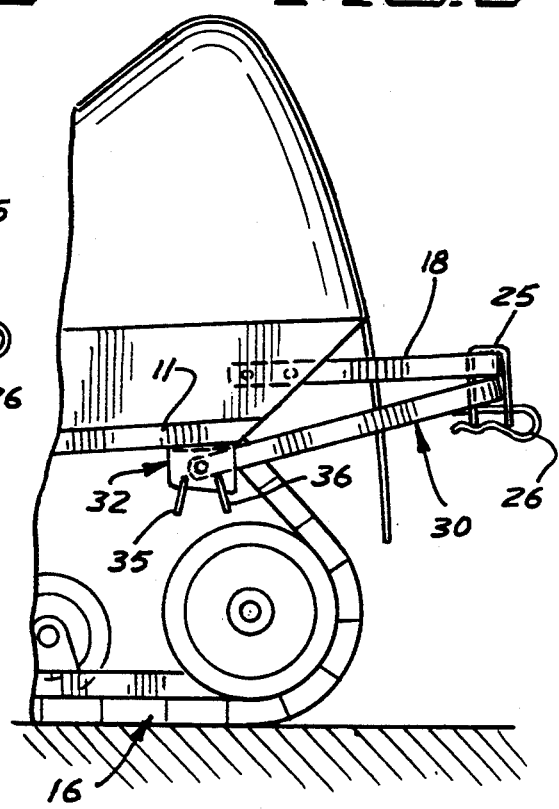
FIG. 3 is a view in rear end elevation showing the invention herein in an operative position.
Figure 5:
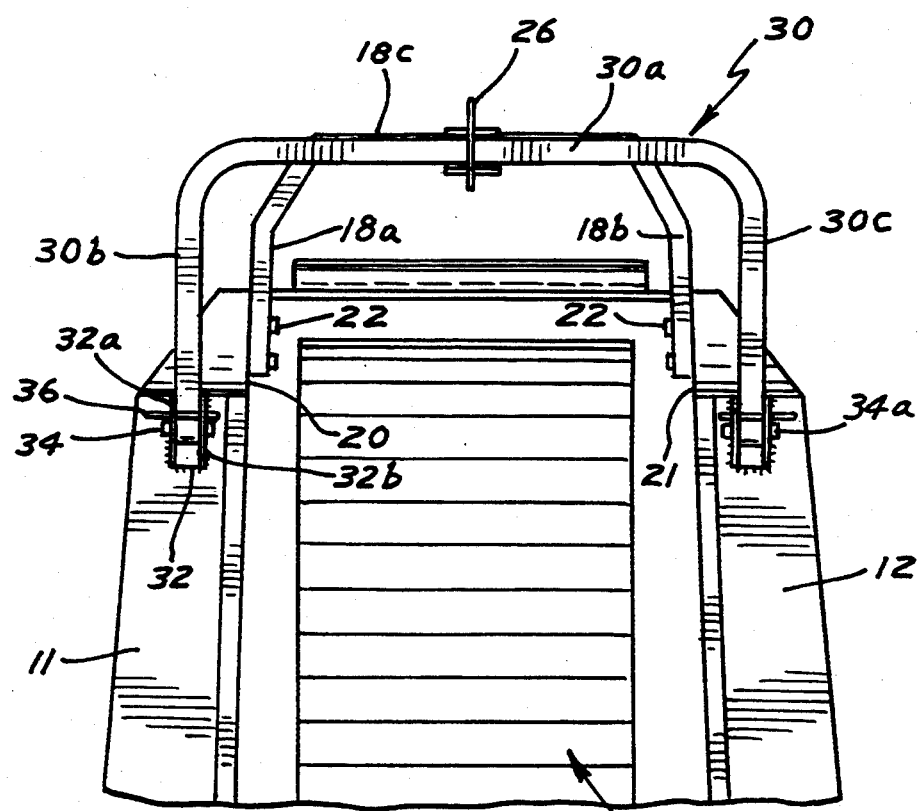
FIG. 5 is a segmental view in side elevation showing the invention herein in alternate positions.
Figure 7:
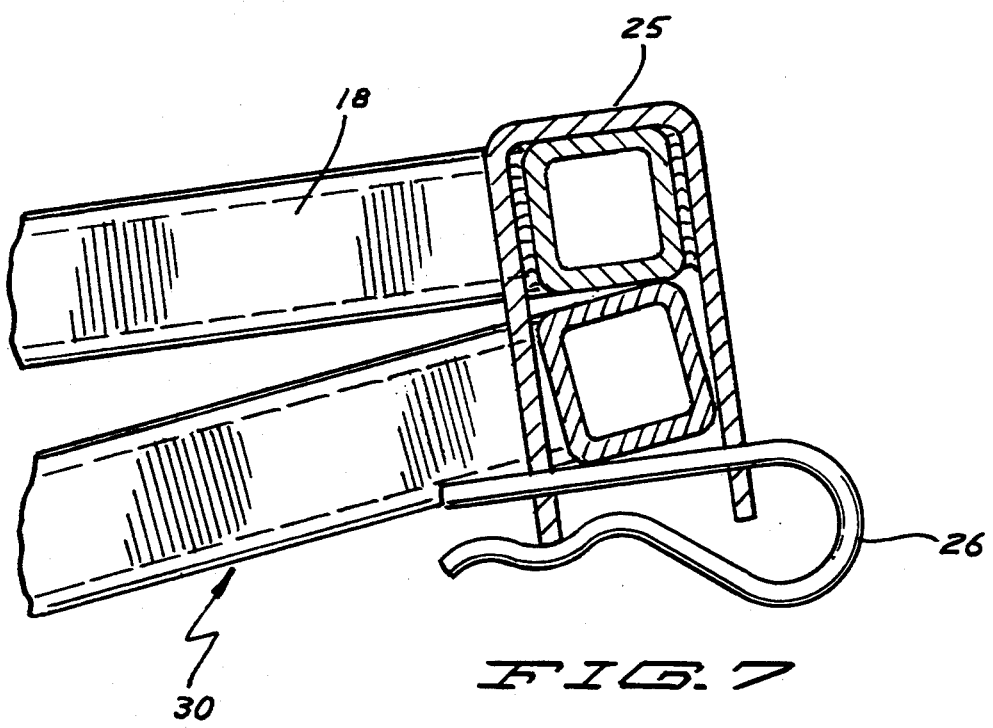

Said elevating member has a central portion 30a and right angled side arms 30b and 30c. U-shaped brackets 32 and 33 are secured as here indicated by bolts 31 adjacent and below each rearward end portion of the running boards which are integral with the frame member which is not shown. Said brackets are inverted having their side walls extend downwardly as at 32a as shown in FIGS. 3 and 4 and as shown in FIG. 5 and particularly in an enlarged partial view in FIG. 5 and a view in elevation in FIG. 7. Bolts 31 are vertically disposed.

As shown in FIGS. 4 and 5, said elevating member 30 is shown secured in raised position held by the insertable or removable pin members 36 and 36a extending through the brackets 32 and 33.

The width of said elevating member 30 is sufficient to permit it to swing under said track 16 and said side arms thereof extend to said brackets 32 and 33 to have their end portions respectively pivoted therein held by headed hinge pins or bolts 34 and 34a, as has been described.

Disposed transversely through said brackets 32 and 33 below and forward of said bolts 34 and 34a is bolt 35 also representing bolt 35a which in like manner is disposed through the bracket 33 but not here shown. Said bolts 35 and 35a are situated as stop members for said elevating member to hold the same in substantially a vertical position leaning slightly rearwardly when in depending position to hold the rear end portion of the snowmobile in a raised position. Spaced forwardly of said bolts 35 and 35a in said brackets 32 and 33 are pin members 36 and 36a as shown in FIG. 3 which are removably disposable through apertures 37 extending through said brackets 32 and 33. Said pins hold said elevating member 30 in raised position. Upon removal of said pins, said elevating member drops to a vertical position and the pins are re-inserted through said apertures for safe keeping. Said pins, being conventional hair pin fasteners, when inserted in said brackets as just described also prevent the snowmobile from being dislodged from its elevated position by a backward shove.

All of the brackets or holding members herein, are suitably apertured to receive their respective bolts and pin fasteners as described and illustrated.

OPERATION

Figure 1:
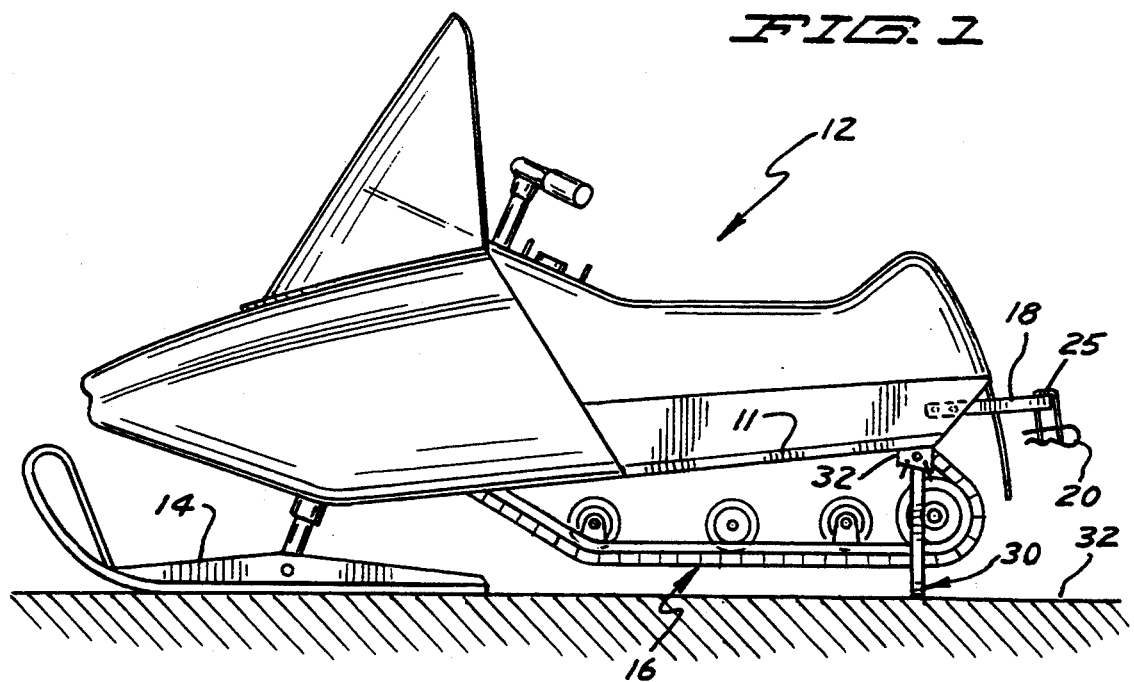
FIG. 1 is a side elevational view.
Figure 2:
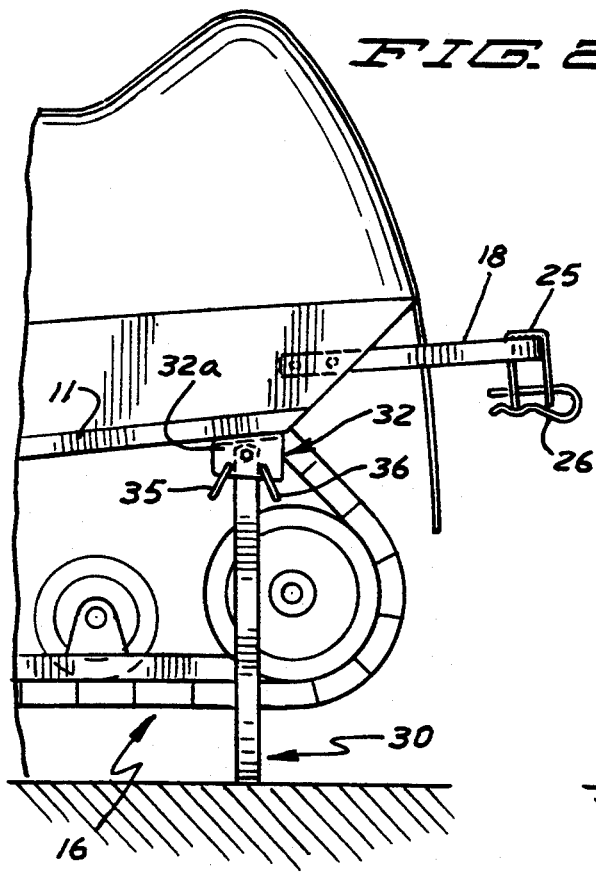
FIG. 2 is a broken rear side elevational view showing the invention herein in an inoperative position.

When the snowmobile is placed in an inoperative or parked position as in FIG. 1, the elevating member is easily positioned. The operator will raise the rear end portion of the snowmobile and upon releasing the elevating member, said member will swing down into an upright position underlying the snowmobile.

The pin members 36 and 36a are first removed from the brackets 32 and 33. The rear end portion of the snowmobile is then raised momentarily by lifting the handle member 18, which can be done with the use of one hand at a time and the fasteners 36 and 36a are removed by the other hand. The elevating member 30 being gravity actuated immediately swings down to underlie the track 16. The forward swinging movement of said member 30 is stopped or blocked by the bolts 35 and 35a, the raised portion of the swowmobile is lowered for support by said elevating member 30 and then the pin members 36 and 36a are replaced through the brackets 32 and 33. Thus the elevating member is locked in position against rearward dislodgement.

Although not here shown, locking means such as padlocks may be substituted for the pin members 36 and 36a to lock the elevating member in its upright elevating position and thus provide a deterrent to the theft of a snowmobile while it is in parked position.

MODIFICATION

Figure 6:
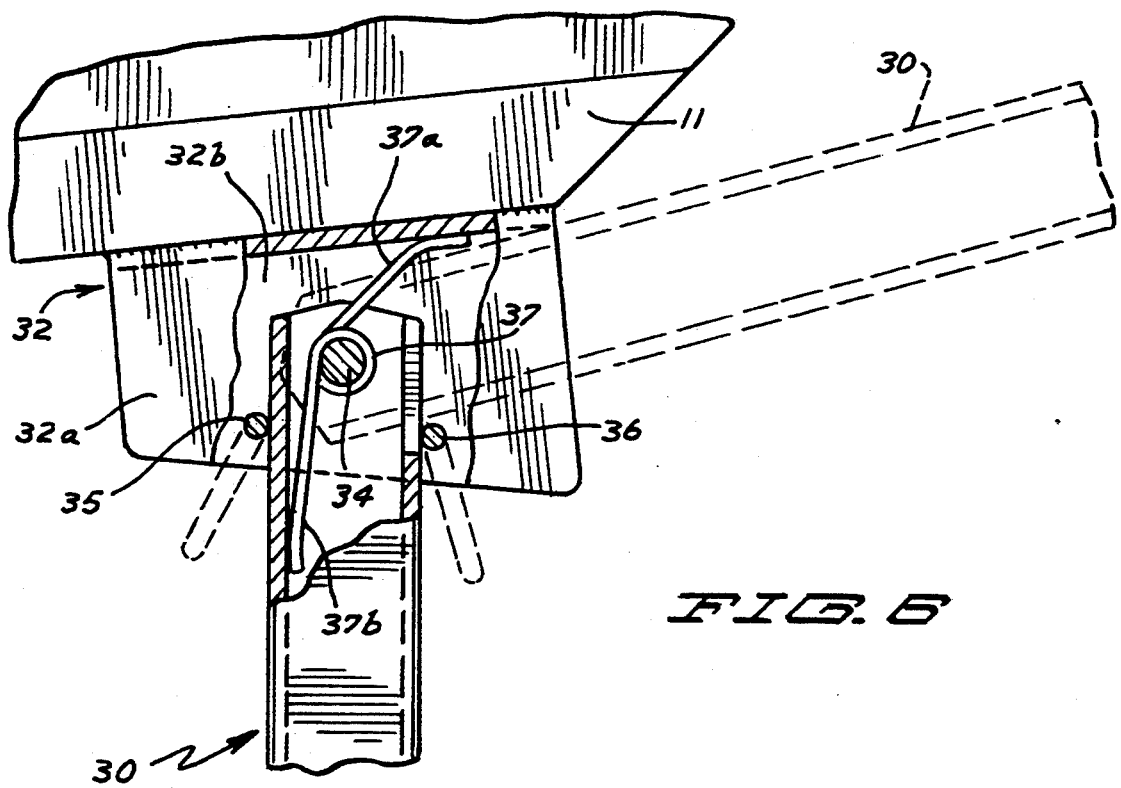
FIG. 6 is a segmental view in evertical section taken on line 6—6 of FIG. 5 as indicated.

When the elevating member 30 is released from its inoperative position to be positioned to elevate the rearward portion of the snowmobile, its downward movement is accelerated and made more positive by the addition of a pair of torsion springs 37 mounted onto the pivot pins 34 and 34a, the torsion springs being represented by the torsion spring 37 as shown in FIGS. 5 and 6.

The upper arm 37a of said torsion spring as seen in FIG. 5 engages the adjacent body portion of the snowmobile and may be secured thereto merely by tension by a spot weld if desired. The other arm 37b of said torsion spring is disposed within the adjacent inner channel wall of the adjacent arm of said elevating member bearing thereagainst. The torsion springs by their pressure provide a good deal of impetus to the down swing of said elevating member in giving it a positive self positioning effect.

It will of course be understood that various changes may be made in the form, details, arrangement or proportions of the device of the invention without departing from the scope of the invention, which generally stated, consists in an apparatus capable of carrying out the objects above set forth, such as disclosed and defined in the appended claims.

What is claimed is:

1. A supporting and elevating device for a snowmobile, comprising
   an elevating member comprising a pair of spaced parallel arms and an integral cross member,
   a bracket at each side of a rear frame portion of a snowmobile,
   said arms respectively being pivoted within said brackets and having a length each to provide sufficient height to raise and support the rear portion of a snowmobile above the underlying supporting surface,
   means in connection with said brackets retaining said elevating member in a raised inoperative position,
   said means in connection with said brackets being removable to release said elevating means,
   means carried by said brackets to limit downward forward swinging movement of said elevating member upon being released positioning the same in a vertical elevating operating position, and
   said means in connection with said brackets being replaceable in said brackets preventing said elevating means from becoming dislodged from its elevating position.

2. The structure of claim 1, wherein
   said means carried by said brackets consists of a bolt extending through each of said brackets forwardly thereof from the direction of the downward swinging approach of said elevating member to be in a vertical position elevating said snowmobile.

3. The structure of claim 1, wherein
   said means in connection with said brackets consist of a pin insertable through each of said brackets to be positioned therein rearwardly of said elevating member when in vertical position preventing rearward dislodgement of said elevating member.

4. A supporting elevating device for a snowmobile, comprising
   an elevating member having a pair of spaced parallel arms and an integral cross member,
   a bracket at each side of a rear frame portion of a snowmobile, each having a hinge pin therein,
   said arms respectively being pivoted to said hinge pins and having a length to provide sufficient height to raise and support the track portion of a snowmobile above the underlying supporting surface,
   means releasably holding said elevating member in raised inoperative position,
   means carried by said brackets to limit downward forward movement of said elevating member positioning the same in a vertical elevating operating position, upon being released from said inoperative position,
   insertable means carried by said brackets locking said elevating means in its elevating position to prevent its dislodgement, and
   means in connection with said brackets accelerating said downward forward movement of said elevating member.

5. The structure of claim 4, including
   said means in connection with said brackets comprising a pair of torsion springs respectively mounted upon each of said hinge pins, said torsion springs each having a pair of extended arms, an arm of each of said torsion springs being secured to an adjacent body portion of said snowmobile, and the other arm of each of said torsion springs being secured to the adjacent of the arms of said elevating member, said arms of said respective torsion springs being arranged such that when said elevating member is raised to be secured to said handle, said torsion springs are under their greatest degree of tension.

6. The structure of claim 4, including
a handle secured to the rear of said snowmobile projecting therefrom.

7. The structure of claim 4, including
a flexible snow deflecting member depending from the rear of said snowmobile.

* * * * *